Patented May 23, 1939

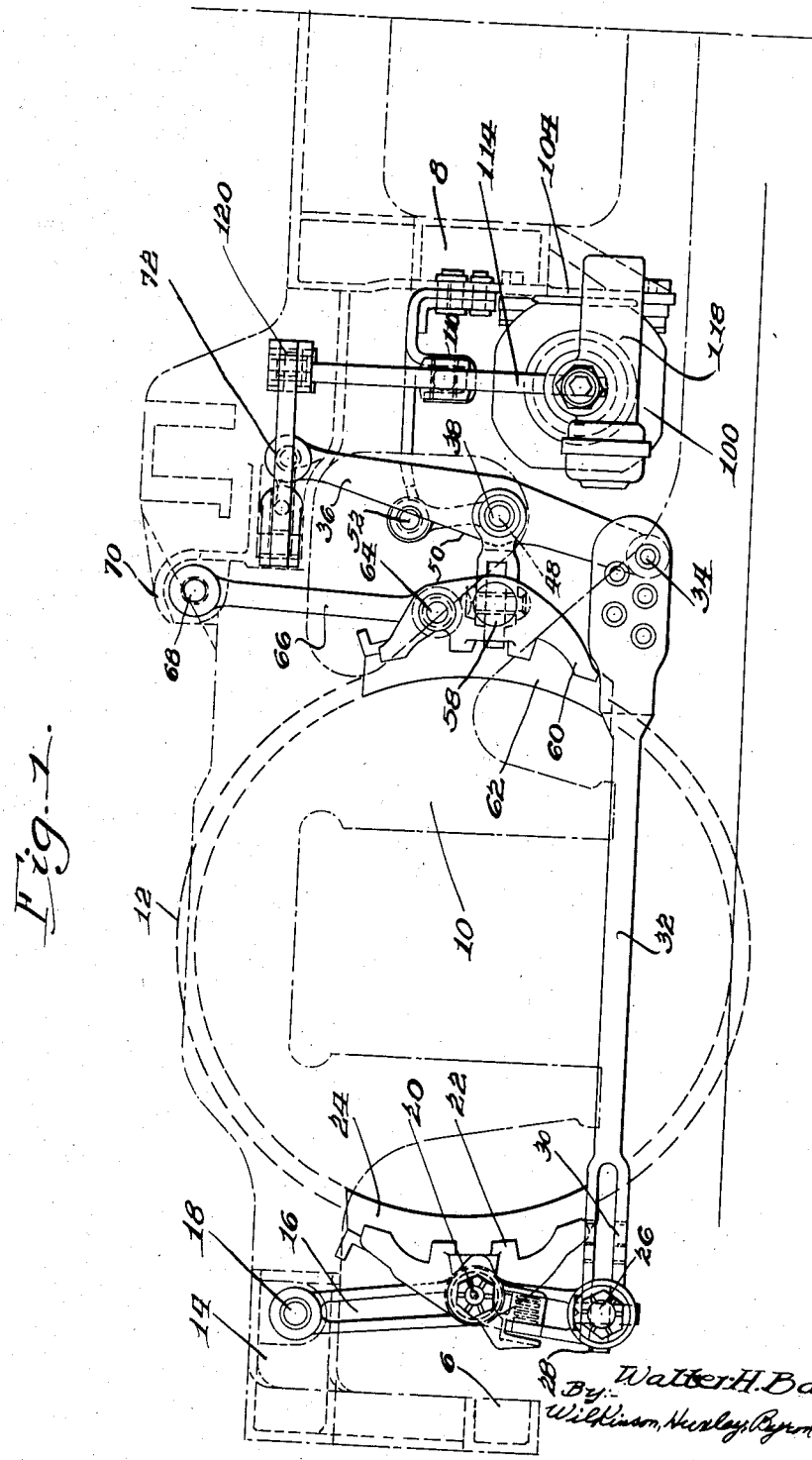

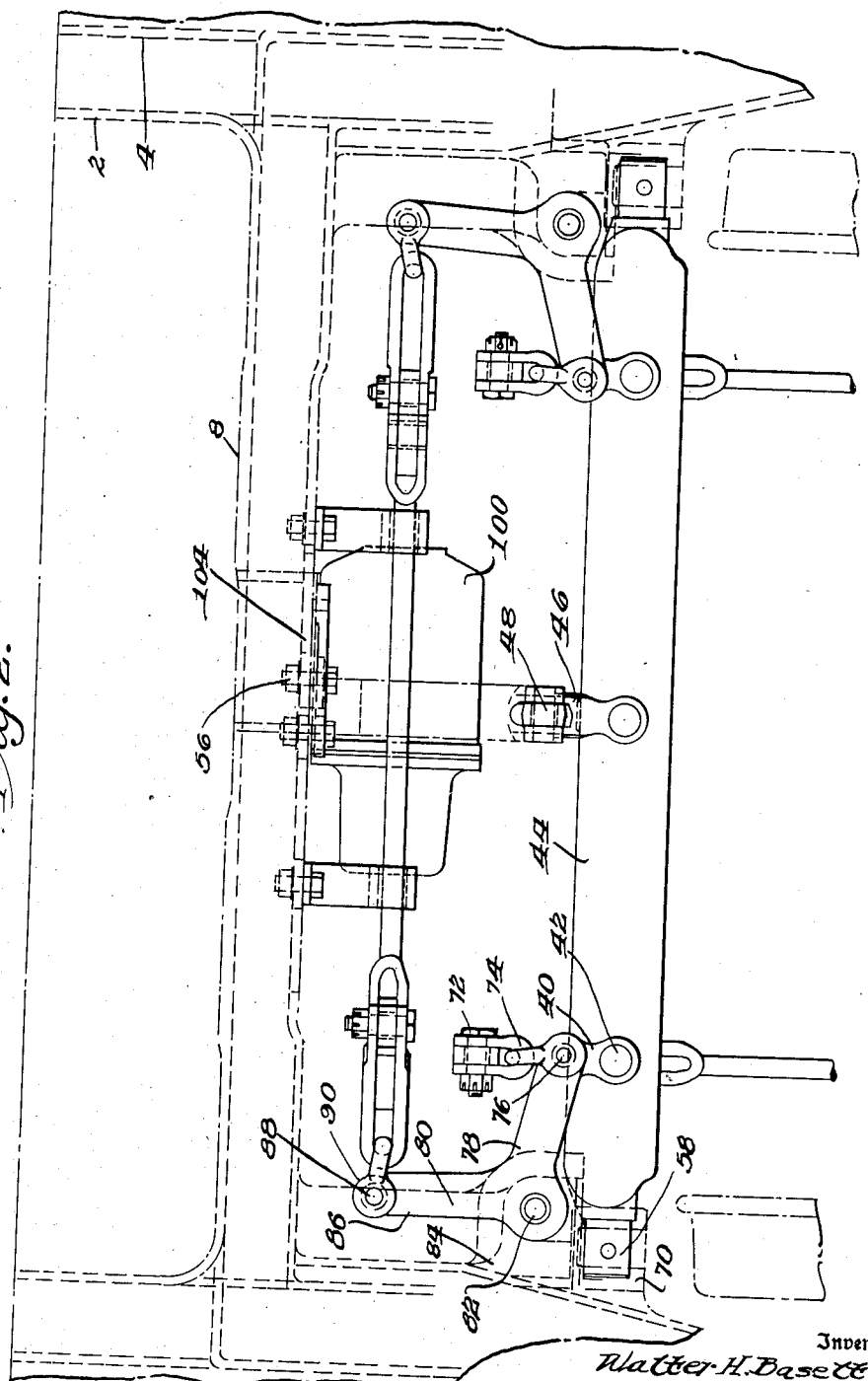

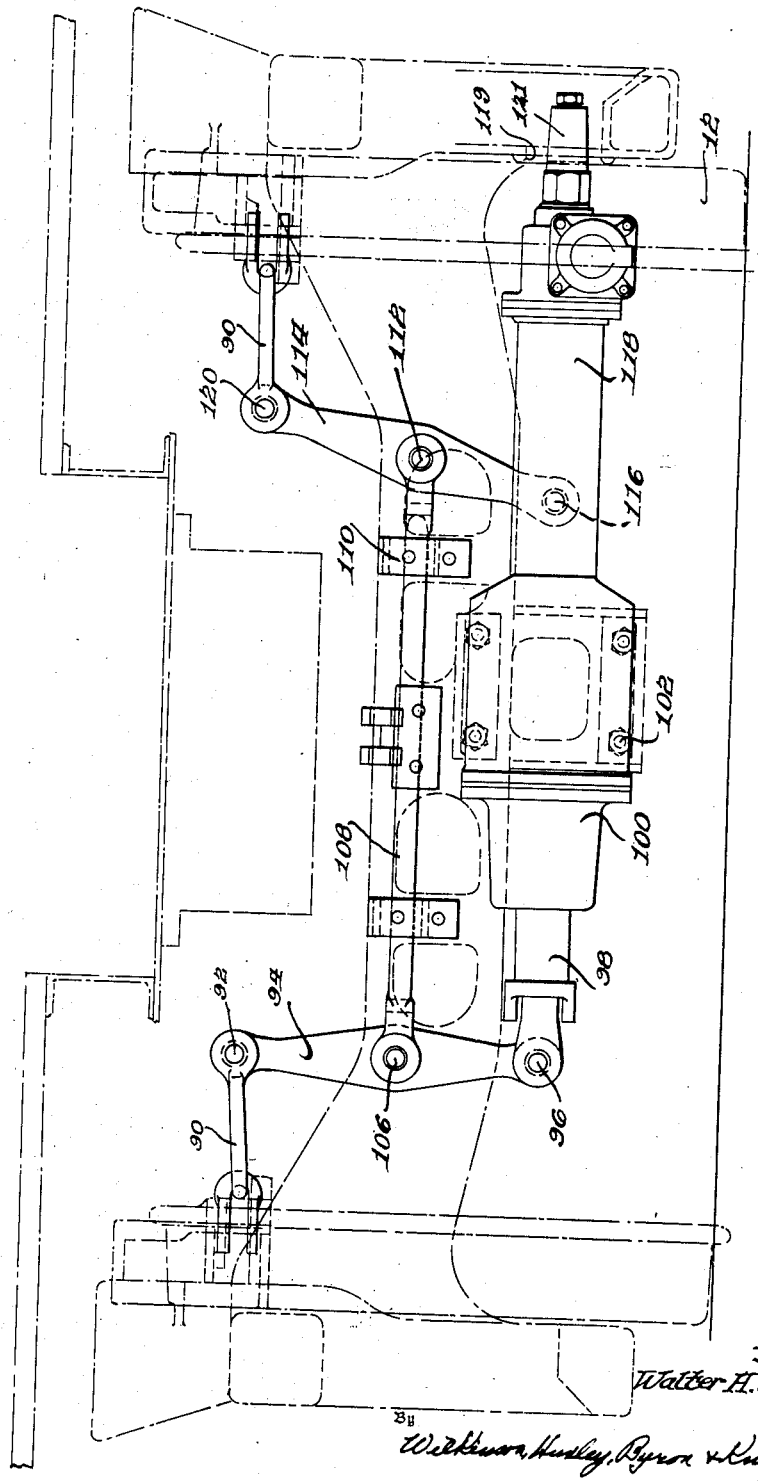

2,159,366

UNITED STATES PATENT OFFICE 2,159,366

BRAKE ARRANGEMENT

Walter H. Baselt, Chicago, Ill., assignor to American Steel Foundries, Chicago, Ill., a corporation of New Jersey Original application June 17, 1935, Serial No. 27,067. Divided and this application June 20, 1938, Serial No. 214,797

20 Claims. (Cl. 188—56)

This invention pertains to brake mechanism, this application being a division of application Serial No. 27,067, filed June 17, 1935.

It is desirable in some constructions of trains or cars to provide brake equipment which, while effective and powerful enough to handle the loads imposed upon it, still is disposed so as not to restrict the space between the end rails and side frames of the truck. This is particularly true in the present high speed type of trains wherein the motors are mounted on certain of the trucks, and other trucks are used to articulate adjacent cars.

It is therefore an object of this invention to provide a brake mechanism which will be effective for braking operation of high speed trains, yet is disposed to provide ample clearance for the mounting of the car bodies and the driving mechanism.

Another object is to provide a brake mechanism which is simple in form, inexpensive to make and maintain, and may be provided for each wheel and axle assembly.

Yet another object is to provide a brake mechanism which is flexible and may be provided with operating means disposed transversely of the truck.

A further object is to provide brake mechanism wherein automatic slack adjusting means is provided, which mechanism may be disposed transversely of the truck.

Other objects, features, capabilities and advantages are comprehended by the invention, as will later appear and as are inherently possessed thereby.

Referring to the drawings:

Figure 1 is an enlarged fragmentary side elevation of a truck construction having applied thereto a form of brake mechanism embodying the invention;

Figure 2 is an enlarged fragmentary top plan view of the truck construction and associated brake mechanism shown in Figure 1; and Figure 3 is an enlarged fragmentary transverse sectional elevation of the truck and brake mechanism illustrated in Figures 1 and 2, the same being taken substantially in the plane of the transverse center line of the truck.

Referring now more in detail to the drawings, there is shown a form of truck and brake construction wherein the mounting is inboard of the truck whereby the construction is adapted particularly for use on trailer trucks. In this form of construction the truck frame 2 consists essentially of the spaced side frames 4 connected adjacent the ends thereof by means of the end rails 6 and connected intermediate the ends thereof by means of the spaced transoms 8. The side frames are provided with the spaced pedestals 10 adapted to receive suitable journal means such as journal boxes (not shown) of the wheel and axle assemblies 12.

In this form of construction, the side frames adjacent the outer ends thereof are provided with the brackets 14 to which the upper ends of the hanger levers 16 are pivotally connected as at 18, said hanger levers being disposed substantially in the plane of the adjacent wheels and being pivotally connected as at 20 intermediate the ends thereof to the brake heads 22 provided with the brake shoes 24. The lower ends of the hanger levers are connected as at 26 to the hanger lever connector 28, said hanger lever connector extending transversely of the truck connecting the hanger levers on opposite sides of said truck. The hanger lever connectors are adjustably connected as at 30 to the pull rod 32 extending below the axle, the inner end of said pull rod being adjustably connected as at 34 to the lower end of the live truck lever 36. Said live truck lever is pivotally connected intermediate the end thereof as at 38 to the fulcrum 40, the opposite ends of said fulcrum being connected as at 42 to the brake beam 44.

Said brake beam 44 is provided with the fulcrum 46 pivotally connected as at 48 to the balance hanger 50, said balance hanger being pivoted as at 52 adjacent the upper end thereof to the balance hanger bracket 54 secured as at 56 to the adjacent transom 8. The ends of said brake beam 44 are connected as at 58 to the inner brake heads 60 provided with the brake shoes 62, said brake shoes being pivotally connected as at 64 to the lower end of the brake hangers 66, the upper ends thereof being pivotally connected as at 68 to the brackets 70 provided on the adjacent side frame and inwardly extending therefrom. The upper end of the live truck lever 36 is pivotally connected as at 72 to the clevis 74, said clevis being pivotally connected as at 76 to the inner arm 78 of the bell crank 80. The bell crank 80 is pivotally connected as at 82 to the bracket 84 provided on the side frame and adjacent transom.

The outer arm 86 of the bell crank is pivotally connected as at 88 to the clevis 90, the clevis of the bell crank on one side of the truck being pivotally connected as at 92 to the upper end of the live cylinder lever 94, the lower end of said cylinder lever being pivotally connected as at 96 to the piston rod 98 of the operating cylinder 100, said cylinder being connected as at 102 to the bracket 104 provided on the adjacent transom 8. The live cylinder lever 94 is pivotally connected as at 106 to the pull rod 108, the pull rod extending transversely of the truck through the guiding brackets 110, the opposite end of said pull rod being connected as at 112 to the dead cylinder lever 114, the lower end of said dead cylinder lever being pivotally connected as at 116 to the automatic slack adjuster 118 provided on said cylinder. In order to permit the cylinder 100 and slack adjuster 118 to be mounted as shown, the side frame 4 adjacent the slack adjuster is provided with an opening 119 adapted to receive the end part 121 of said slack adjuster, the size of the opening being sufficient to provide clearance with said part. Although the automatic slack nected to the truck frame, or a manual slack adjuster 118 is shown connected to the cylinder, it of course is appreciated that it may be conadjuster, or an adjustable bracket may be provided on either the truck frame or the cylinder. The upper end of the dead cylinder lever 114 is pivotally connected as at 120 to its clevis 90.

In operation of this form of mechanism, assuming the brakes to be in released position, introduction of the brake fluid to the operating cylinder causes outward movement of the piston 98. This movement of the piston 98 causes the pull rod to move the upper end of the cylinder lever 94 inwardly. The live cylinder lever 94 fulcrums about the point 106 and the upper end of said cylinder lever also moves inwardly. Inward movement of the cylinder levers causes inward movement of the outer arms 86 of the bell cranks 80, thus causing movement of the inner arms 78 of the bell cranks toward the adjacent ends of the truck. This movement causes the upper ends of the live truck levers to be moved toward the ends of the trucks to thus apply the inner brake heads through the fulcrums 40 of the brake beams 44. Continued movement of the live truck levers causes the pull rod 32 to move the hanger lever connector and consequently the hanger levers toward the wheel to apply the brake shoe 24 to the outer periphery of the wheel. Release of the brake fluid causes reverse movement of the brake mechanism to release the brakes.

While I have herein described and upon the drawings shown an illustrative embodiment of the invention, it is to be understood that the invention is not limited thereto but may comprehend other constructions, arrangements of parts, details and features without departing from the spirit of the invention.

I claim:

1. In a railway car truck, the combination of a frame having side members and a transom, a supporting wheel and axle assembly, power means mounted on said transom transversely of said frame, brake rigging for said assembly including brake beams disposed on opposite sides of said assembly, and connections between said power means and said brake rigging inwardly of said wheels comprising interconnected levers connected to said brake rigging at opposite sides of the truck.

2. In a railway car truck, the combination of a frame having side members and a transom, a supporting wheel and axle assembly, power means mounted on said transom transversely of said frame, brake rigging for said assembly including brake beams disposed on opposite sides of said assembly, and connections between said power means and said brake rigging inwardly of said wheels, said connections comprising bell crank levers fulcrumed from said frame and operatively connected to said brake rigging, and interconnected levers operatively connected to said power means and to said bell crank levers at opposite sides of the truck.

3. In a railway truck truck, the combination of a frame having side members and a transom, a supporting wheel and axle assembly, power means mounted on said transom transversely of said frame, brake rigging for said assembly including brake beams disposed on opposite sides of said assembly, said rigging including dead and live truck levers fulcrumed from said beams inwardly of the wheels and interconnected below said axle, and connections between said power means and said brake rigging inwardly of said wheels comprising interconnected levers operatively connected to said live truck levers at opposite sides of the truck.

4. In a railway car truck, the combination of a frame having side members and a transom, a supporting wheel and axle assembly, power means mounted on said transom transversely of said frame, brake rigging for said assembly including brake beams disposed on opposite sides of said assembly, said rigging including dead and live truck levers fulcrumed from said beams inwardly of the wheels and interconnected below said axle, and connections between said power means and said brake rigging inwardly of said wheels, said connections comprising bell crank levers fulcrumed from said frame and operatively connected to said live truck levers, and interconnected levers operatively connected to said power means and operatively connected to said bell crank levers at opposite sides of the truck.

5. In a railway car truck, the combination of a frame having side members and a transom, one of said members having an opening, a supporting wheel and axle assembly, power means mounted on said transom transversely of said frame and having a slack adjuster associated therewith, said slack adjuster extending into said opening, brake rigging for said assembly including brake beams disposed on opposite sides of said assembly, and connections between said power means and said brake rigging inwardly of said wheels comprising interconnected levers operatively connected to said brake rigging at opposite sides of the truck, one of said levers being operatively associated with said slack adjuster.

6. In a railway car truck, the combination of a frame having side members and a transom, one of said members having an opening, a supporting wheel and axle assembly, power means mounted on said transom transversely of said frame and having a slack adjuster associated therewith, said slack adjuster extending into said opening, brake rigging for said assembly including brake beams disposed on opposite sides of said assembly, and connections between said power means and said brake rigging inwardly of said wheels comprising levers interconnected intermediate the ends thereof, said levers being connected at their lower ends to said power means and said slack adjuster, respectively, and having their opposite ends operatively connected to said brake rigging at opposite sides of the truck.

7. In a railway car truck, the combination of a frame having side members and a transom, a supporting wheel and axle assembly, power means mounted on said transom transversely of said frame, brake rigging for said assembly including brake beams disposed on opposite sides of said assembly, and connections between said power means and said brake rigging inwardly of said wheels comprising interconnected live and dead levers connected at corresponding ends to opposite ends of said power means and at their other ends to said brake rigging.

8. In a railway car truck, the combination of a frame having side members and a transom, a supporting wheel and axle assembly, power means mounted on said transom transversely of said frame, brake rigging for said assembly including brake beams disposed on opposite sides of said assembly, and connections between said power means and said brake rigging inwardly of said wheels, said connections comprising bell crank levers on opposite sides of the frame, and interconnected live and dead levers connected at corresponding ends to opposite ends of said power means and at their other ends to said brake rigging through said bell cranks.

9. In a railway car truck, the combination of a frame having side members and a transom, a supporting wheel and axle assembly, power means mounted on said transom transversely of said frame, brake rigging for said assembly including brake beams disposed on opposite sides of said assembly, dead and live truck levers fulcrumed from said beams inwardly of the wheels and interconnected below said axle, and connections between said power means and said brake rigging inwardly of said wheel comprising interconnected live and dead levers connected at corresponding ends to opposite ends of said power means and at their other ends to said live truck levers.

10. In a railway car truck, the combination of a frame having side members and a transom, a supporting wheel and axle assembly, power means mounted on said transom transversely of said frame, brake rigging for said assembly including brake beams disposed on opposite sides of said assembly, dead and live truck levers fulcrumed from said beams inwardly of the wheels and interconnected below said axle, and connections between said power means and said brake rigging inwardly of said wheels, said connections comprising bell crank levers on opposite sides of the frame connected to said live truck levers, and interconnected live and dead levers connected at corresponding ends to opposite ends of said power means and at their other ends to said bell crank levers.

11. In a railway car truck, the combination of a frame having side members and a transom, a supporting wheel and axle assembly, power means mounted on said transom transversely of said frame, brake rigging for said assembly including brake beams disposed on opposite sides of said assembly, dead and live truck levers fulcrumed from said beams inwardly of the wheels and interconnected below said axle, and connections between said power means and said brake rigging inwardly of said wheels, said connections comprising bell crank levers on opposite sides of the frame and each having an inwardly extending arm connected to one of said live truck levers, and interconnected live and dead levers connected at corresponding ends to opposite ends of said power means and at their other ends to the other arms of said bell crank levers.

12. In a railway car truck, the combination of a frame having side members and a transom, one of said members having an opening, a supporting wheel and axle assembly, a cylinder mounted on said transom and having a piston operating transversely of said frame and toward one of said members, an automatic slack adjuster adjacent said cylinder and extending into the opening of said member, brake rigging for said assembly including brake beams disposed on opposite sides of said assembly, and connections between said cylinder and said brake rigging, said connections comprising dead frame levers on opposite sides of the frame operatively connected to said live truck levers, and interconnected live and dead levers connected at corresponding ends to the piston of said cylinder and slack adjuster, respectively, and at their other ends to said brake rigging through said frame levers.

13. In a railway car truck, the combination of a frame having side members and a transom, one of said members having an opening, a supporting wheel and axle assembly, a cylinder mounted on said transom and having a piston operating transversely of said frame and toward one of said members, an automatic slack adjuster adjacent said cylinder and extending into the opening of said member, brake rigging for said assembly including brake beams disposed on opposite sides of said assembly, and connections between said cylinder and said brake rigging, said connections comprising bell crank levers on opposite sides of the frame each having an arm extending inwardly and being connected to the adjacent live truck lever, and interconnected live and dead levers connected at corresponding ends to the piston of said cylinder and slack adjuster, respectively, and at their other ends to the other arms of said bell crank levers.

14. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, a dead truck lever pivoted to said truck frame on the outside of each wheel, a live truck lever supported on the inside of each wheel, straps connecting pairs of live and dead truck levers and disposed below the adjacent axle, a bell crank disposed adjacent each live truck lever and pivoted to said truck frame, said bell crank being pivotally connected to the adjacent live truck lever, a transversely disposed operating cylinder supported on each transom and having an automatic slack adjuster thereon, an upwardly extending dead cylinder lever pivotally connected to said automatic slack adjuster and to the adjacent bell crank, a live cylinder lever pivotally connected to the piston of said cylinder on the side opposite said slack adjuster and pivotally connected to its adjacent live truck lever, and a connection between said live and dead cylinder levers intermediate the ends thereof.

15. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, a dead truck lever pivoted to said truck frame on the outside of each wheel, a live truck lever supported on the inside of each wheel, straps connecting pairs of live and dead truck levers and disposed below the adjacent axle, a bell crank disposed adjacent each live truck lever and pivoted to said truck frame, said bell crank being pivotally connected to the adjacent live truck lever, a transversely disposed operating cylinder supported on each transom and having an automatic slack adjuster thereon, a dead cylinder lever pivotally connected to said automatic slack adjuster and to the adjacent bell crank, a live cylinder lever pivotally connected to the piston of said cylinder on the side opposite said slack adjuster and pivotally connected to its adjacent live truck lever, a connection between said live and dead cylinder levers intermediate the ends thereof, and a support on said transoms for the adjacent connection.

16. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, brake mechanism adapted to have braking cooperation with the wheels including brake beams disposed to connect brake means on opposite sides of the truck, a horizontally disposed brake cylinder connected to each of said transoms and having a piston operating in the direction of one of said side frames, a dead cylinder lever pivoted on the opposite side of said cylinder to said piston and connected to the adjacent brake mechanism, a live cylinder lever pivotally connected to said piston and to the brake mechanism adjacent said live cylinder lever, and a connection between said cylinder levers intermediate the ends thereof.

17. In a brake arrangement, the combination of a truck frame including a side frame, end rail members and spaced transom members, wheels supporting said truck frame, brake rigging having cooperative relation to one of said wheels, said rigging including brake beams disposed on opposite sides of said wheel, dead and live truck levers fulcrumed from said beams inwardly of the wheel, a connection between said levers and below the wheel center, a bell crank pivoted to said truck frame and connected to one of said brake levers, and a transversely disposed brake cylinder supported on one of said transom members and operatively connected to said bell crank.

18. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, a dead truck lever pivoted to said truck frame on the outside of each wheel, a live truck lever supported on the inside of each wheel, straps connecting pairs of live and dead truck levers and disposed below the adjacent axle, a bell crank disposed adjacent each live truck lever and pivoted to said truck frame, said bell crank being pivotally connected to the adjacent live truck lever, a horizontally disposed operating cylinder connected to each of said transoms and having a piston operating in the direction of one of said side frames, a support on said cylinder extending in a direction toward the opposite side frame, a dead cylinder lever pivoted to said support and to the adjacent bell crank, a live cylinder lever pivotally connected to said piston and to its adjacent bell crank, and a connection between said cylinder levers intermediate the ends thereof.

19. In a brake arrangement, the combination of a truck frame including a side frame, end rail members and spaced transom members, wheels supporting said truck frame, brake rigging having cooperative relation to one of said wheels, said rigging including brake beams disposed on opposite sides of said wheel, dead and live truck levers fulcrumed from said beams inwardly of the wheel, a connection between said levers and below the wheel center, a dead frame lever pivoted to said truck frame and connected to one of said brake levers, and a transversely disposed brake cylinder supported on one of said transom members and operatively connected to said dead frame lever.

20. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, a dead truck lever pivoted to said truck frame on the outside of each wheel, a live truck lever supported on the inside of each wheel, straps connecting pairs of live and dead truck levers and disposed below the adjacent axle, a dead frame lever disposed adjacent each live truck lever and pivoted to said truck frame, said frame lever being pivotally connected to the adjacent live truck lever, a horizontally disposed operating cylinder connected to each of said transoms and having a piston operating in the direction of one of said side frames, a support on said cylinder extending in a direction toward the opposite side frame, a dead cylinder lever pivoted to said support and to the adjacent frame lever, a live cylinder lever pivotally connected to said piston and to its adjacent frame lever, and a connection between said cylinder levers intermediate the ends thereof.

WALTER H. BASELT.